US010463059B2

(12) United States Patent
Bush (10) Patent No.: US 10,463,059 B2
(45) Date of Patent: Nov. 5, 2019

(54) SCRAPER BLADES (71) Applicant: TAYLOR COMMERCIAL FOODSERVICE INC., Rockton, IL (US)

(72) Inventor: Mark E. Bush, Rockton, IL (US)

(73) Assignee: Taylor Commercial Foodservice Inc., Rockton, IL (US)

( * ) Notice: Subject to any disclaimer, the term of this patent is extended or adjusted under 35 U.S.C. 154(b) by 164 days.

(21) Appl. No.: 15/224,202

(22) Filed: Jul. 29, 2016

(65) Prior Publication Data
US 2017/0042180 A1 Feb. 16, 2017

Related U.S. Application Data (60) Provisional application No. 62/205,189, filed on Aug. 14, 2015.

(51) Int. Cl.
A23G 9/22 (2006.01)
B01F 15/00 (2006.01)
F25D 31/00 (2006.01)
B08B 1/00 (2006.01)

(52) U.S. Cl.
CPC ........ A23G 9/224 (2013.01); B01F 15/00058 (2013.01); B08B 1/005 (2013.01); A23V 2002/00 (2013.01); B01F 2215/0021 (2013.01)

(58) Field of Classification Search
CPC ............... A23G 9/224; B01F 15/00058; B01F 2215/0021; B08B 1/005; B08B 9/00; B08B 9/0808; A23V 2002/00
See application file for complete search history.

(56) References Cited

U.S. PATENT DOCUMENTS 2,491,852 A * 12/1949 Carvel .................... A23G 9/045
15/93.1
2,526,367 A * 10/1950 Kaltenbach .............. A23G 9/16
366/313
2,746,730 A * 5/1956 Swenson ................ A23G 9/224
366/311
2,836,401 A * 5/1958 Phelan ...................... A23G 9/16
15/256.5

(Continued)

FOREIGN PATENT DOCUMENTS

CN 202536032 11/2012
CN 203985911 12/2014
(Continued)

Primary Examiner — Queenie S Dehghan
(74) Attorney, Agent, or Firm — Brinks Gilson & Lione (57) ABSTRACT A scraper blade for a frozen dessert machine includes a blade body extending from a first end to a second end. The blade body includes a cutting edge on a first side of the blade body facing a scraping direction. A biasing projection extends from a second side of the blade body in a direction opposite the scraping direction of the cutting edge. A frozen product machine includes a freezing cylinder defining a longitudinal axis and a rotating beater assembly within the freezing cylinder. The rotating beater assembly includes a beater body and a scraper blade as described above. The scraper blade is operatively connected to the beater body. The biasing projection of the scraper blade biases the cutting edge against an inner diameter surface of the freezing cylinder.

20 Claims, 6 Drawing Sheets (56) References Cited

U.S. PATENT DOCUMENTS

| | | | |
|---|---|---|---|
| 3,145,017 A * | 8/1964 | Thomas | A23G 9/16 366/310 |
| 3,380,716 A | 4/1968 | Arter | |
| 5,074,125 A | 12/1991 | Schifferly | |
| 5,312,184 A | 5/1994 | Cocchi | |
| 5,410,888 A | 5/1995 | Kaiser et al. | |
| 5,485,880 A | 1/1996 | Zeuthen | |
| 5,884,501 A | 3/1999 | Goldstein | |
| 6,267,049 B1 * | 7/2001 | Silvano | A23G 9/12 366/144 |
| 6,494,055 B1 * | 12/2002 | Meserole | A23G 9/045 366/305 |
| 6,668,576 B1 | 12/2003 | Etlender | |
| 2014/0102128 A1 | 4/2014 | Jejcic | |

FOREIGN PATENT DOCUMENTS

| | | | |
|---|---|---|---|
| CN | 204090940 | 1/2015 | |
| EP | 1544882 A2 * | 6/2005 | A23G 9/12 |
| GB | 1272913 | 5/1972 | |
| GB | 1367786 | 9/1974 | |
| JP | 561187752 | 8/1986 | |

* cited by examiner

SCRAPER BLADES

CROSS-REFERENCE TO RELATED APPLICATIONS

This application claims the benefit of priority under 35 U.S.C. § 119(e) to U.S. Provisional Application No. 62/205,189, filed Aug. 14, 2015, which is incorporated herein by reference in its entirety.

BACKGROUND OF THE INVENTION

1. Field of the Invention

The present disclosure relates to blades, and more particularly to scraper blades such as those used on a rotating beater to scrape ice crystals from the refrigerated surface of a freezing cylinder.

2. Description of Related Art

Frozen product systems mix and deliver frozen products such as ice cream, frozen yogurt and milkshakes. Liquid product is stored in a hopper or other containing vessel. Generally, when the frozen product is to be prepared, a pump draws the liquid product from the hopper into a mixing chamber and mixes the liquid product with air. The mixture is pumped into a freezing cylinder where a rotating beater within the freezing cylinder rotates and mixes the liquid product, while scraper blades installed on the rotating beater scrape ice crystals from the refrigerated surface of the freezing cylinder that are in turn mixed with the liquid product to form the frozen product. When the frozen product is to be served, the frozen product is dispensed from the freezing cylinder. Generally, the scraper blades use the viscosity of the product and gravity to apply a biasing force to force a cutting edge of the scraper blades against the refrigerated surface of the freezing cylinder.

Such conventional methods and systems have generally been considered satisfactory for their intended purpose. However, there is still a need in the art for improved scraper blades. The present disclosure provides a solution for this need.

SUMMARY OF THE INVENTION

A scraper blade for a frozen dessert machine includes a blade body extending from a first end to a second end. The blade body includes a cutting edge on a first side of the blade body facing a scraping direction. A biasing projection extends from a second side of the blade body in a direction opposite the scraping direction of the cutting edge.

In accordance with some embodiments, the biasing projection is a lever arm. The fulcrum of the lever arm can be defined on a backside of the blade body between the cutting edge and an end of the lever arm. The lever arm can be an arcuate lever arm. The blade body can extend along a longitudinal axis. It is contemplated that the lever arm can be a first lever arm and that the blade body can include a second lever arm offset from the first lever arm along the longitudinal axis. The first lever arm can extend from the first end of the blade body and the second lever arm can extend from the second end of the blade body in a direction opposite the scraping direction of the cutting edge. The blade body can include a recessed portion between the first and second lever arms. The recessed portion can include a mounting hole.

The lever arm can be a cleft arm that defines an arm axis and includes a pair of flanges extending in opposite directions across the arm axis defining a cleft therebetween. The cleft arm can be symmetrical about the arm axis. Each flange of the cleft lever arm can be arcuate and can include an outward facing concave surface and an inward facing convex surface. The inward facing convex surfaces of each flange can face one another. The cleft can be defined between the inward facing convex surfaces of each flange.

In another aspect, a frozen product machine includes a freezing cylinder defining a longitudinal axis and a rotating beater assembly within the freezing cylinder. The rotating beater assembly includes a beater body and a scraper blade as described above. The scraper blade is operatively connected to the beater body. The biasing projection of the scraper blade biases the cutting edge against an inner diameter surface of the freezing cylinder.

The frozen product machine can include a metal backing having a female portion mated to the recessed portion of the scraper blade, between the beater body and the scraper blade. The scraper blade can be a first scraper blade and the rotating beater assembly can include a second scraper blade operatively connected to the beater body. The second scraper blade can be offset from and opposite the first scraper blade with respect to the longitudinal axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
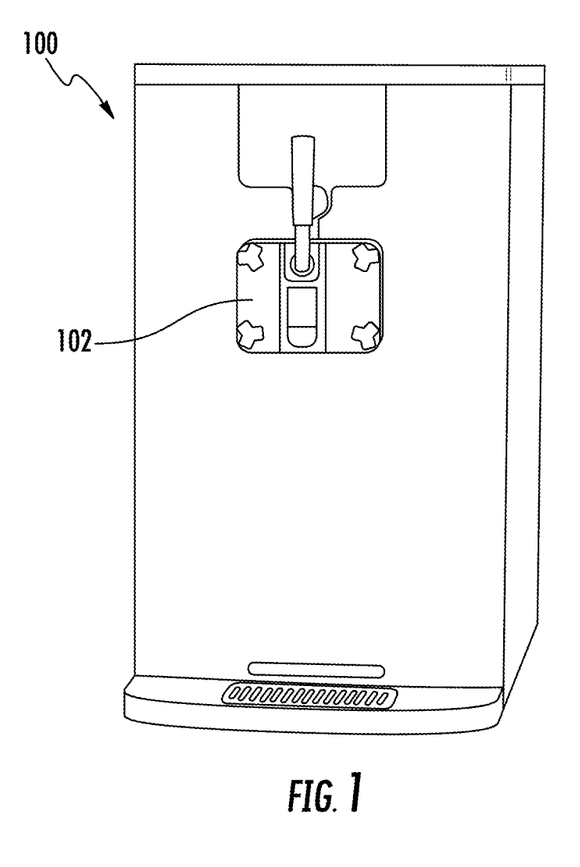
FIG. 1 is front view of a frozen product machine constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a frozen product machine constructed in accordance with the disclosure is shown in FIG. 1 and is designated generally by reference character 100. Other embodiments of frozen product machines in accordance with the disclosure, or aspects thereof, are provided in FIGS. 2-6, as will be described. The systems and methods described herein can be used for mixing and delivering frozen products such as ice cream, frozen yogurt and milkshakes, in a more efficient manner.

Figure 2:
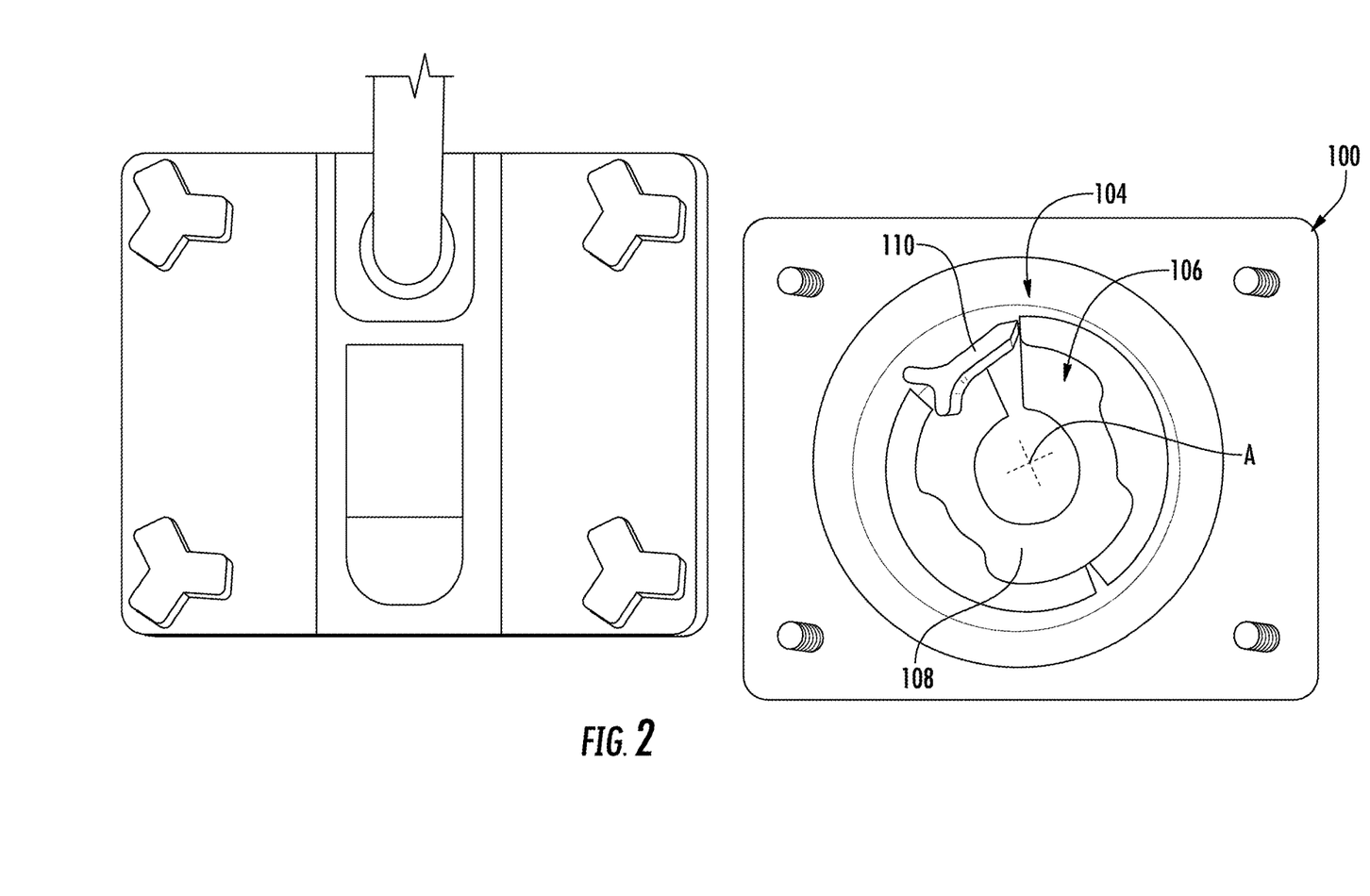
FIG. 2 is a front exploded view of the frozen product machine of FIG. 1, with the front spout removed to show the outlet of the freezing cylinder and the rotating beater assembly.

As shown in FIGS. 1 and 2, a frozen product machine 100, e.g. a frozen dessert machine, includes a front spout 102. Behind front spout 102, is a freezing cylinder 104 defining a longitudinal axis A and a rotating beater assembly 106 within freezing cylinder 104. Rotating beater assembly 106 includes a beater body 108 and a scraper blade 110. Scraper blade 110 is operatively connected to beater body 108 with a metal backing 120, shown in FIG. 3 and described below.

Figure 3:
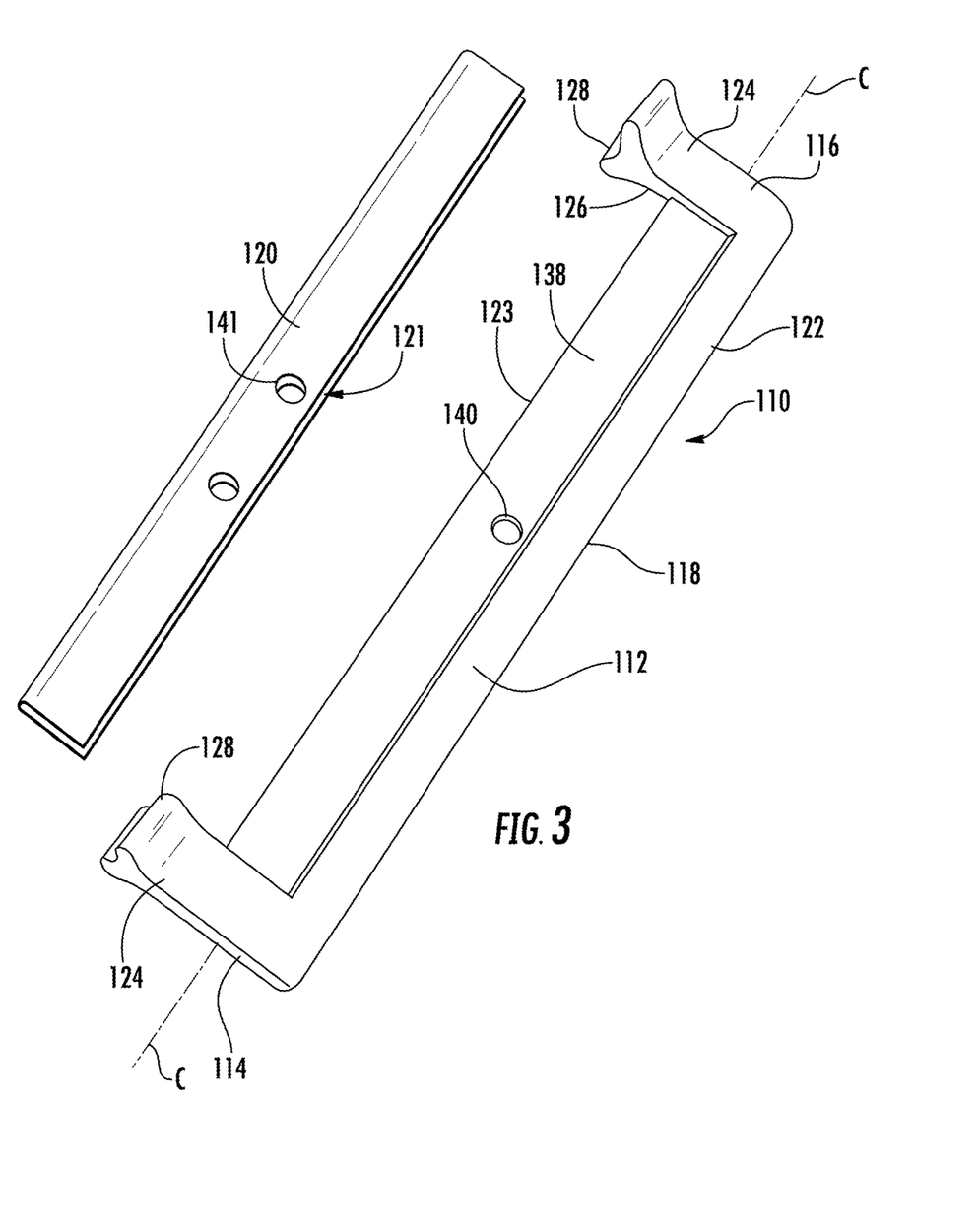
FIG. 3 is a perspective view of a scraper blade and a metal backing constructed in accordance with the present disclosure, showing a cleft lever arm extending from each end of the scraper blade.

With reference now to FIG. 3, scraper blade 110 includes a blade body 112 extending from a first end 114 to a second end 116 along a longitudinal axis C. Longitudinal axis C is substantially parallel to longitudinal axis A when scraper blade 110 is assembled into rotating beater assembly 106. Blade body 112 includes a cutting edge 118 on a first side 122 of blade body 112 facing a scraping direction. Respective biasing projections 124, for example, lever arms, e.g. cleft arms, extend from each of first and second ends 114 and 116, respectively, of blade body 112 from a second side 123 of blade body 112, in a direction opposite the scraping direction of cutting edge 118. Cleft arms 124 are offset from one another along longitudinal axis C. The fulcrum of cleft arm 124 is defined on a backside 126 of blade body 112 between cutting edge 118 and an end 128 of cleft arm 124. Blade body 112 includes a recessed portion 138 between first and second cleft arms 124. Recessed portion 138 includes a mounting hole 140.

Figure 4:
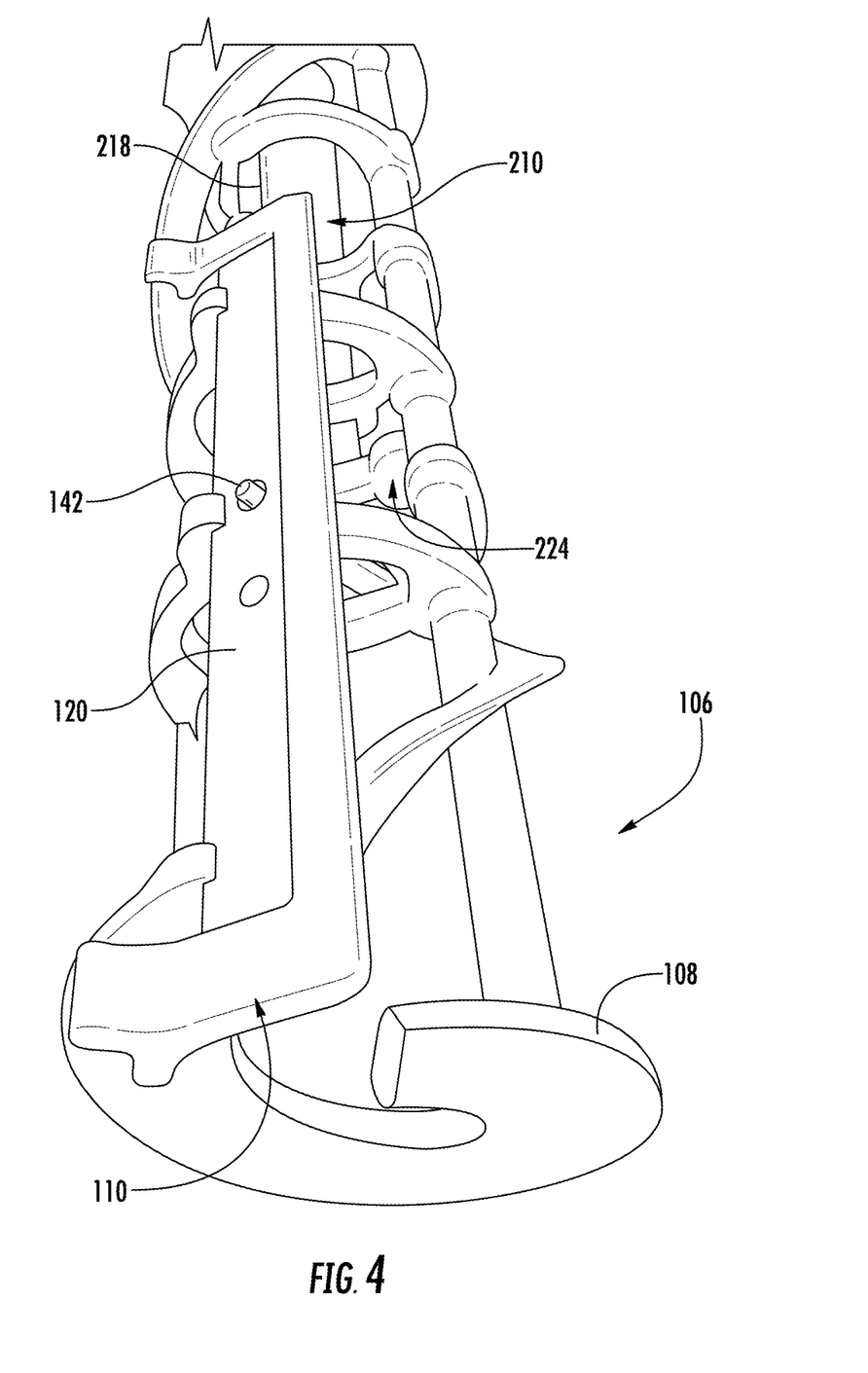
FIG. 4 is a perspective view of a rotating beater assembly constructed in accordance with the present disclosure, showing the scraper blade mounted to the beater body with the metal backing.

As shown in FIGS. 3 and 4, frozen product machine 100, shown in FIG. 1, includes a metal backing 120 having a female portion 121 mated to recessed portion 138 of scraper blade 110, between beater body 108 and scraper blade 110. Metal backing 120 includes a mounting hole 141 that is aligned with mounting hole 140 during when metal backing 120 and scraper blade 110 are assembled. Those skilled in the art will readily appreciate that metal backing 120 is not required, however, tends to provide additional stiffness to scraper blade 110. It is contemplated that without metal backing 120, instead of recessed portion 138, blade body 112 can be smooth between first and second ends 114 and 116, respectively, and/or can include additional biasing projections 124 extending therefrom. Mounting holes 140 and 141 engage with a post 142 that extends from beater body 108. Post 142 helps to keep scraper blade 110 axially positioned on beater body 108. Scraper blade 110 is a first scraper blade and rotating beater assembly 106 includes a second scraper blade 210 operatively connected to beater body 108. Second scraper blade 210 is offset from and opposite first scraper blade 110 with respect to a longitudinal axis of beater assembly, e.g. parallel to longitudinal axis A when assembled within freezing cylinder 104. Second scraper blade 210 can similarly have biasing projections extending therefrom, as described below. While beater assembly 106 is shown and described herein as having two scraper blades 110 and 210, those skilled in the art will readily appreciate that beater assembly 106 can include any number of suitable scraper blades, e.g. one or more.

Figure 5:
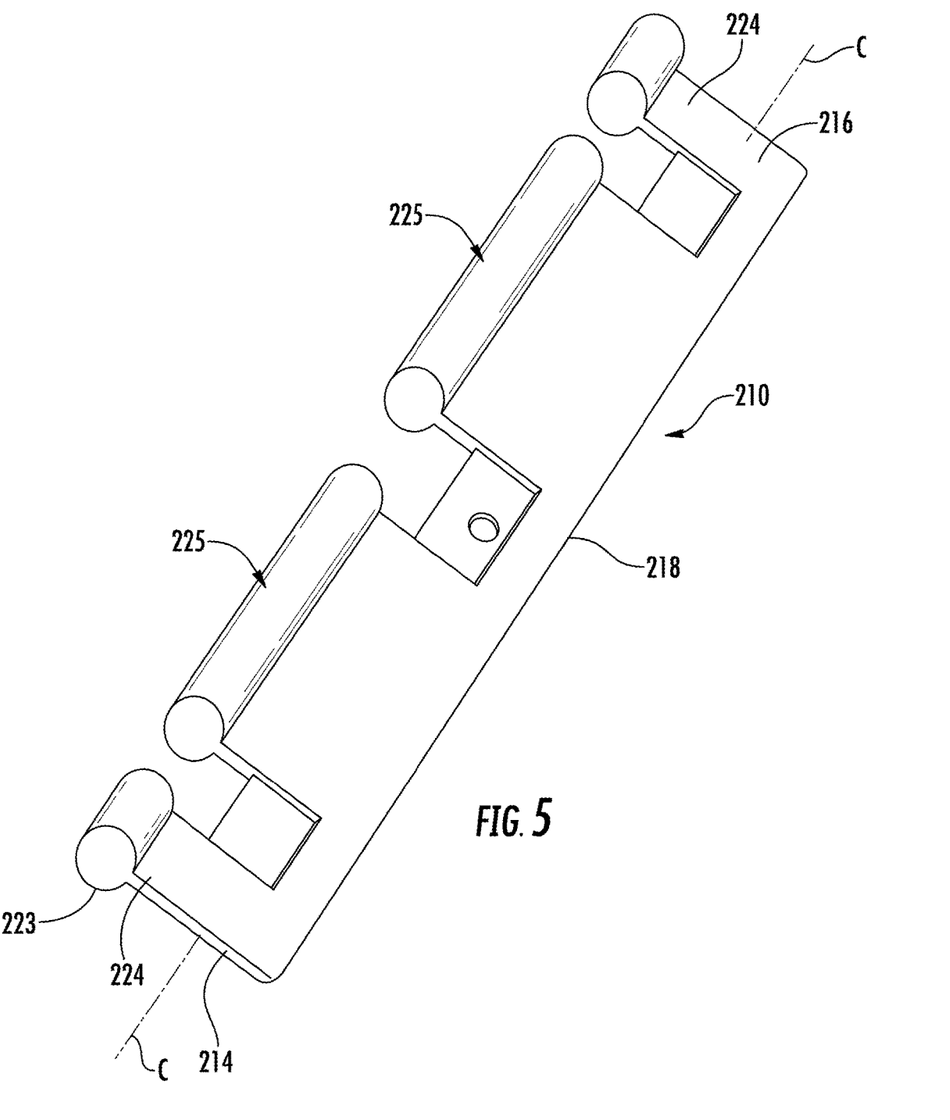
FIG. 5 is a perspective view of another embodiment of a scraper blade constructed in accordance with the present disclosure, showing biasing projections extending from each end of the scraper blade and in the middle of the scraper blade.

As shown in FIGS. 4 and 5, second scraper blade 210 includes a biasing projection 224 having a spherically shaped cross-section. Biasing projection 224 is similar to biasing projections 124 in that a surface 233 of biasing projection 224 abuts an inner diameter surface of a freezing cylinder, e.g. freezing cylinder 104, and biases a cutting edge 218 against the inner diameter surface, as described below. Scraper blade 210 also includes intermediate biasing projections 225 between respective ends 214 and 216 of scraper blade 210. While scraper blade 110 includes biasing projections 124 on first and second ends 114 and 116, those skilled in the art will readily appreciate that scraper blade 110 can be constructed without metal backing 120, and can also include intermediate biasing projections, similar to intermediate biasing projections 225. Intermediate biasing projections, e.g. intermediate biasing projections 225, can be used in conjunction with, or as an alternative to, biasing projections 124 and 224. Moreover, while two to four biasing projections or intermediate biasing projections are shown per blade, it is contemplated that any number of suitable projections can be used, for example, at least one biasing projection.

Those skilled in the art will readily appreciate that while first and second scraper blades 110 and 210, respectively, are shown with different biasing projections 124 and 224, both first and second scraper blades 110 and 210 can include the same biasing projections as one-another or a mixture of biasing projections on the same scraper blade. Additionally, while biasing projections 124 and 224 are shown herein as having cleft arms and spherically shaped cross-sections, those skilled in the art will readily appreciate that there are a variety of appropriate biasing projection shapes that can be used. Moreover, it is contemplated that a variety of differently shaped biasing projections can be used on the same scraper blade.

Figure 6:
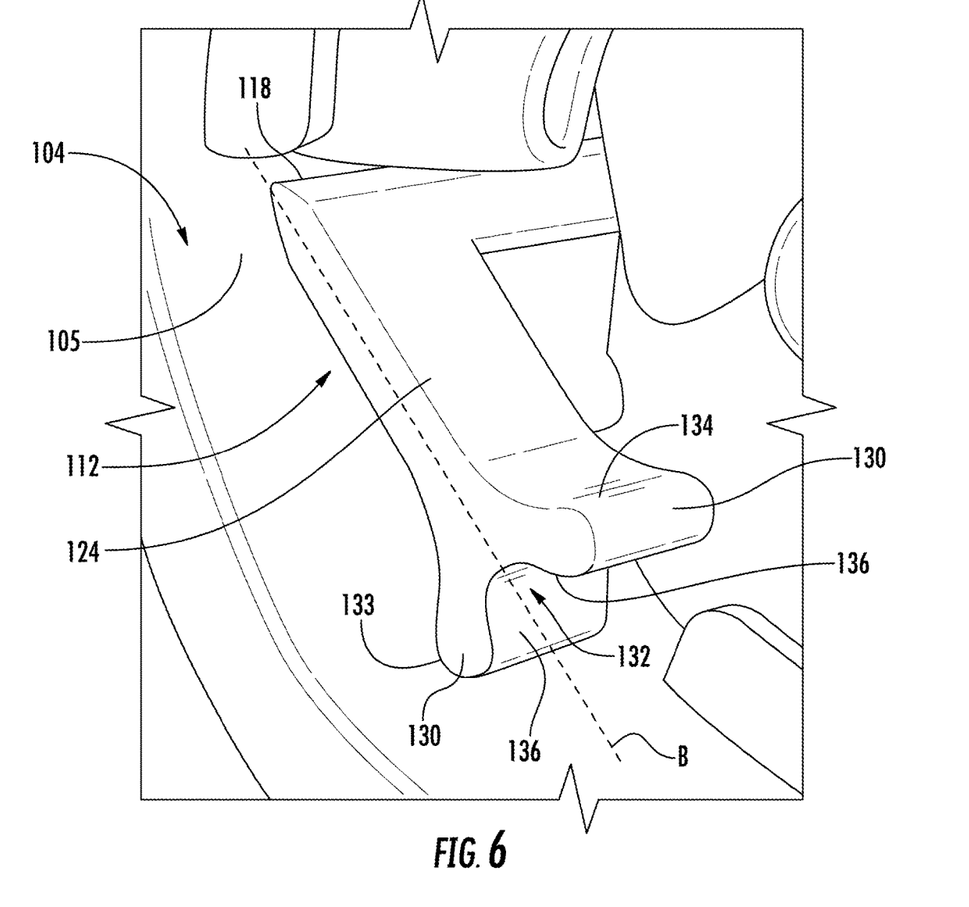
FIG. 6 is a perspective view of the outlet of the freezing cylinder and rotating beater assembly of FIG. 2, showing the cutting edge of the scraper blade abutting the inner diameter surface of the freezing cylinder.

With reference now to FIG. 6, cleft arm 124 defines an arm axis B and includes a pair of flanges 130 extending in opposite directions across arm axis B defining a cleft 132 therebetween. Arm axis B is substantially perpendicular to longitudinal axis C. Cleft arm 124 is symmetrical about arm axis B. Each flange 130 of cleft lever arm 124 is arcuate and includes an outward facing concave surface 134 and an inward facing convex 136 surface. Inward facing convex surfaces 136 of each flange 130 face one another. Those skilled in the art will readily appreciate that while shown and described herein as being a cleft arm 124 with two flanges 130, one or both of cleft arms 124 can instead be a lever arm 124 having only one arcuate flange 130. It is contemplated that by having two flanges 130, e.g. being a cleft lever arm, the same scraper blade 110 can be used twice before needing replacement, e.g. by flipping scraper blade 110 over.

With continued reference to FIG. 6, cleft 132 is defined between inward facing convex surfaces 136 of each flange 130. A surface 133 of cleft arm 124 abuts an inner diameter surface 105 of freezing cylinder 104 and biases cutting edge 118 against inner diameter surface 105 of freezing cylinder 104. This bias reduces the potential for ice layer build up on freezing cylinder 104, and thereby reduces potential damage to frozen product machine 100 that may typically be caused by excessive ice buildup in traditional frozen product machines. By reducing the potential for ice layer build up on freezing cylinder 104, the likelihood that the ice layer will act as an insulator between the product and the freezing cylinder 104 is also reduced, resulting in more efficient freezing of the product. This results in overall improved efficiency and cost savings over traditional frozen product machines. Those skilled in the art will readily appreciate that scraper blade 110 is a direct replacement for many traditional scraper blades, and therefore tends to make incorporating scraper blade 110 in traditional frozen product machines through regular preventative maintenance seamless for the operator.

The methods and systems of the present disclosure, as described above and shown in the drawings, provide for frozen product machines with superior properties including reduced ice buildup in the freezing cylinder, resulting in improved efficiency and cost savings. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. The scraper blade for a frozen dessert machine, the scraper blade comprising:
 a blade body extending from a first end to a second end, wherein the blade body includes:
 a cutting edge on a first side of the blade body facing a scraping direction; and
 a biasing projection extending from a second side of the blade body in a direction opposite the scraping direction of the cutting edge, wherein the cutting edge and biasing projection are configured to simultaneously abut a surface to be scrapped, wherein the biasing projection is a lever arm, and wherein the lever arm is a cleft arm that defines an arm axis and includes a pair of flanges extending in opposite directions across the arm axis defining a cleft therebetween.

2. The scraper blade as recited in claim 1, wherein the cleft arm is symmetrical about the arm axis.

3. The scraper blade as recited in claim 1, wherein each flange is arcuate and includes an outward facing concave surface and an inward facing convex surface, wherein the inward facing convex surfaces of each flange face one another.

4. The scraper blade as recited in claim 3, wherein the cleft is defined between the inward facing convex surfaces of each flange.

5. The scraper blade for a frozen dessert machine, the scraper blade comprising:
 a blade body extending from a first end to a second end, wherein the blade body includes:
 a cutting edge on a first side of the blade body facing a scraping direction; and
 a biasing projection extending from a second side of the blade body in a direction opposite the scraping direction of the cutting edge, wherein the cutting edge and biasing projection are configured to simultaneously abut a surface to be scrapped, wherein the blade body extends along a longitudinal axis, wherein the biasing projection is a lever arm, wherein the lever arm is a first lever arm and the blade body includes a second lever arm offset from the first lever arm along the longitudinal axis.

6. The scraper blade as recited in claim 5, wherein the first lever arm extends from the first end of the blade body and the second lever arm extends from the second end of the blade body in a direction opposite the scraping direction of the cutting edge.

7. The scraper blade as recited in claim 5, wherein the blade body includes a recessed portion between the first and second lever arms.

8. The scraper blade as recited in claim 7, wherein the recessed portion includes a mounting hole.

9. A frozen product machine comprising:
 a freezing cylinder defining a longitudinal axis;
 a rotating beater assembly within the freezing cylinder, wherein the rotating beater assembly includes:
 a beater body; and
 a scraper blade operatively connected to the beater body, the scraper blade including a blade body extending from a first end to a second end, wherein the blade body includes:
 a cutting edge on a first side of the blade body facing a scraping direction; and
 a biasing projection extending from a second side of the blade body in a direction opposite the scraping direction of the cutting edge, wherein the biasing projection of the scraper blade biases the cutting edge against an inner diameter surface of the freezing cylinder, wherein the biasing projection is configured to abut an inner diameter surface of the freezing cylinder, wherein the biasing projection and cutting edge are on a same side of the longitudinal axis.

10. The frozen product machine as recited in claim 9, wherein the biasing projection is a lever arm, and wherein the lever arm is a first lever arm and the blade body includes a second lever arm offset from the first lever arm along the longitudinal axis.

11. The frozen product machine as recited in claim 10, wherein the blade body includes a recessed portion between the first and second lever arms.

12. The frozen product machine as recited in claim 11, further comprising a metal backing having a female portion mated to the recessed portion of the scraper blade, between the beater body and the scraper blade.

13. The frozen product machine as recited in claim 9, wherein the scraper blade is a first scraper blade, and wherein the rotating beater assembly includes a second scraper blade operatively connected to the beater body, wherein the second scraper blade is offset from and opposite the first scraper blade with respect to the longitudinal axis.

14. A scraper blade for a frozen dessert machine, the scraper blade comprising:
 a blade body extending from a first end to a second end, wherein the blade body includes:
 a cutting edge on a first side of the blade body facing a scraping direction; and
 a biasing projection extending from a second side of the blade body in a direction opposite the scraping direction of the cutting edge, wherein the biasing projection is a lever arm, and wherein the lever arm is a cleft arm that defines an arm axis and includes a pair of flanges extending in opposite directions across the arm axis defining a cleft therebetween, wherein each flange is arcuate and includes an outward facing concave surface and an inward facing convex surface, wherein the inward facing convex surfaces of each flange face one another.

15. The scraper blade as recited in claim 14, wherein the cleft is defined between the inward facing convex surfaces of each flange.

16. A scraper blade for a frozen dessert machine, the scraper blade comprising:
 a blade body extending from a first end to a second end, wherein the blade body includes:
 a cutting edge on a first side of the blade body facing a scraping direction; and
 a biasing projection extending from a second side of the blade body in a direction opposite the scraping direction of the cutting edge, wherein the cutting edge and biasing projection are configured to simultaneously abut a surface to be scrapped, wherein the biasing projection is not a cutting edge, wherein the biasing projection is a lever arm, and wherein the lever arm is a cleft arm that defines an arm axis and includes a pair of flanges extending in opposite directions across the arm axis defining a cleft therebetween.

17. The scraper blade as recited in claim 16, wherein the fulcrum of the lever arm is defined on a backside of the blade body between the cutting edge and an end of the lever arm.

18. The scraper blade as recited in claim 16, wherein the lever arm is an arcuate lever arm.

19. The scraper blade as recited in claim 16, wherein the cleft arm is symmetrical about the arm axis.

20. The scraper blade as recited in claim 16, wherein each flange is arcuate and includes an outward facing concave surface and an inward facing convex surface, wherein the inward facing convex surfaces of each flange face one another, and wherein the cleft is defined between the inward facing convex surfaces of each flange.

\* \* \* \* \*